(12) United States Patent
Butler et al.

(10) Patent No.: US 7,108,281 B2
(45) Date of Patent: Sep. 19, 2006

(54) STORED GAS INFLATOR WITH FILL VALVE ASSEMBLY

(75) Inventors: William B. Butler, Mesa, AZ (US); Jeffery A. Lafranier, Gilbert, AZ (US); Christopher J. Ruf, Mesa, AZ (US); James S. Dahl, Gilbert, AZ (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 148 days.

(21) Appl. No.: 10/646,488

(22) Filed: Aug. 22, 2003

(65) Prior Publication Data

US 2005/0040633 A1 Feb. 24, 2005

(51) Int. Cl.
*B60R 21/26* (2006.01)

(52) U.S. Cl. ............... 280/737; 137/519.5; 137/533.11

(58) Field of Classification Search ............... 280/737, 280/736, 740, 741, 742; 137/68.13, 519.5, 137/533.11, 223; 141/DIG. 2, 18
See application file for complete search history.

(56) References Cited

U.S. PATENT DOCUMENTS

| | | | | |
|---|---|---|---|---|
| 1,564,624 A | * | 12/1925 | Riley ..................... | 137/533.11 |
| RE28,164 E | * | 9/1974 | Stephenson .................. | 280/737 |
| 3,856,186 A | * | 12/1974 | Hay ........................... | 141/18 |
| 3,895,821 A | * | 7/1975 | Schotthoefer et al. ...... | 280/737 |
| 3,985,375 A | * | 10/1976 | Lewis et al. ................ | 280/737 |
| 5,060,974 A | | 10/1991 | Hamilton et al. | |
| 5,078,422 A | * | 1/1992 | Hamilton et al. ........... | 280/737 |
| 5,344,186 A | | 9/1994 | Bergerson et al. | |
| 5,348,344 A | | 9/1994 | Blumenthal et al. | |
| 5,394,908 A | | 3/1995 | Maness | |
| 5,529,333 A | | 6/1996 | Rizzi et al. | |
| 5,630,619 A | * | 5/1997 | Buchanan et al. .......... | 280/737 |
| 5,683,107 A | * | 11/1997 | Headley et al. ............. | 280/741 |
| 5,711,547 A | | 1/1998 | Blumenthal et al. | |
| 5,897,137 A | * | 4/1999 | Al-Amin et al. ............ | 280/736 |
| 6,173,495 B1 | * | 1/2001 | Erike ....................... | 29/890.14 |
| 6,199,905 B1 | * | 3/2001 | Lewis ........................ | 280/737 |
| 6,273,462 B1 | | 8/2001 | Faigle et al. | |
| 6,607,213 B1 | * | 8/2003 | Yamamori et al. .......... | 280/736 |

FOREIGN PATENT DOCUMENTS

| | | |
|---|---|---|
| DE | 4107845 | 9/1992 |
| DE | 4242457 | 6/1994 |
| DE | 19716827 | 11/1997 |
| EP | 0776798 | 6/1997 |

* cited by examiner

*Primary Examiner*—Ruth Ilan
(74) *Attorney, Agent, or Firm*—Tarolli, Sundheim, Covell & Tummino LLP

(57) ABSTRACT

An inflator (12) includes structure (40, 50, 82) defining a chamber (130). First and second passages (92 and 116) extend through the structure (40, 50, 82). A burst disk (120) closes the first passage (116). A valve housing (142) is received in the second passage (92) and defines a fill passage (154). A fluid (186) is stored under pressure in the chamber (130). An igniter (70) is actuatable for opening the burst disk (120) for enabling the fluid (186) to flow out of the chamber (130) through the first passage (116). A valve member (144) enables flow of the fluid (186) through the fill passage (154) of the valve housing (142) into the chamber (130) and prevents flow out of the chamber (130) through the fill passage (154).

11 Claims, 4 Drawing Sheets

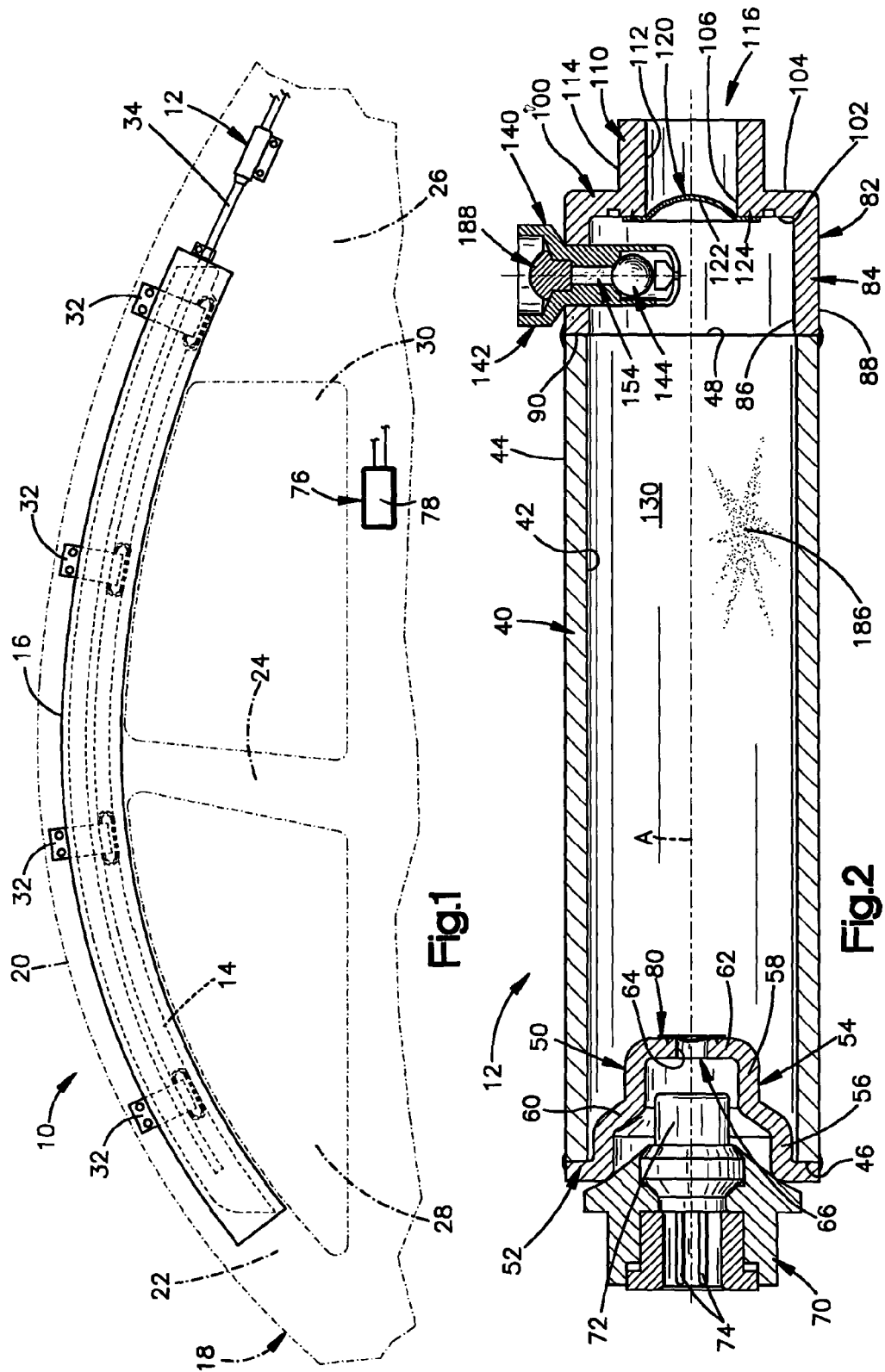

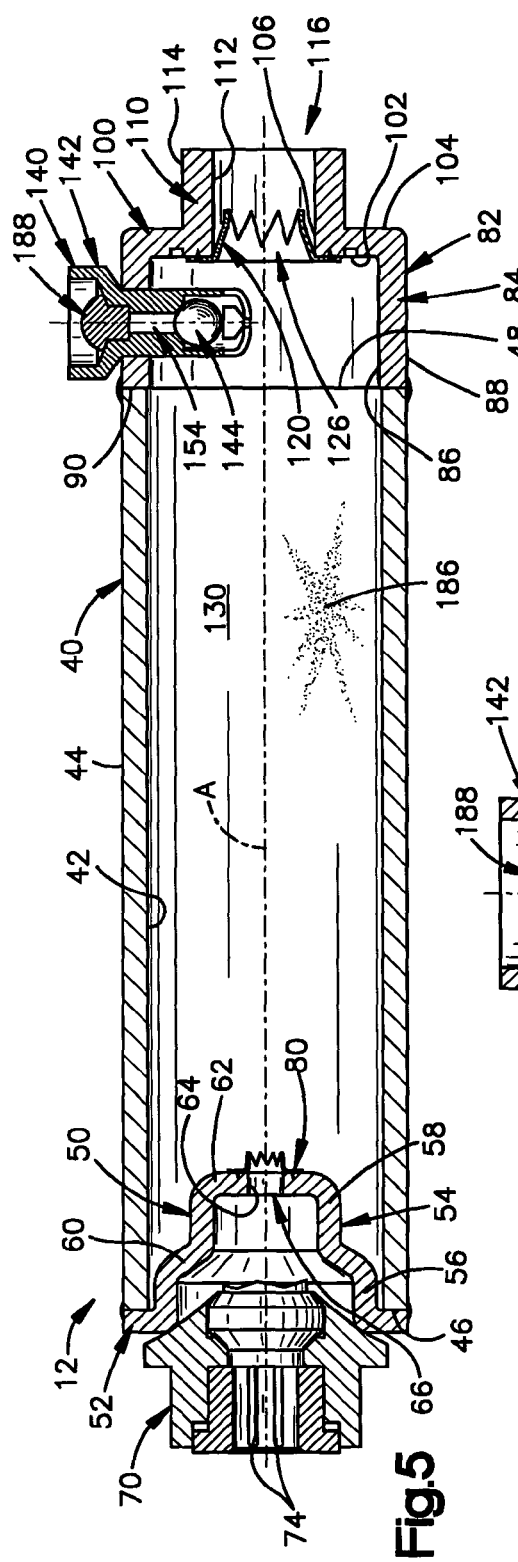
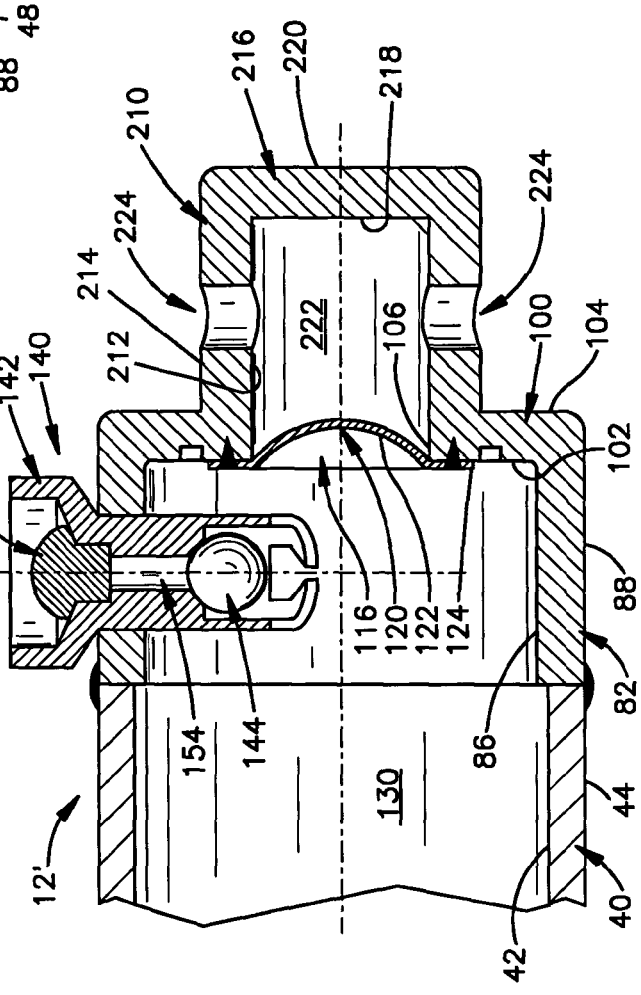
Fig.5
Fig.6

STORED GAS INFLATOR WITH FILL VALVE ASSEMBLY

TECHNICAL FIELD

The present invention relates to an inflator, and particularly to an inflator for use in inflating an inflatable vehicle occupant protection device.

BACKGROUND OF THE INVENTION

A conventional inflator for inflating an inflatable vehicle occupant protection device includes a container having a storage chamber. Inflation fluid under pressure is stored in the storage chamber. An igniter assembly is associated with the container and is actuatable for heating the inflation fluid in the storage chamber to increase the fluid pressure in the storage chamber. The increased fluid pressure ruptures a burst disk. The ruptured burst disk defines an outlet opening through which the inflation fluid flows.

U.S. Pat. No. 5,529,333 describes an inflator for inflating an air bag that includes a container that defines a storage chamber. The container has an opening that leads to the storage chamber. A plug member is received in the opening of the container and closes the opening of the container. Two passages extend through the plug member. A first passage through the plug member enables inflation fluid to flow from the storage chamber toward an air bag. A wall portion of the plug member closes the first passage. The wall portion of the plug member includes a break away center. An actuator is actuatable for opening the break away center of the wall portion of the plug member to form an outlet opening through which inflation fluid flows. A second passage through the plug member is provided for filling the storage chamber with inflation fluid. A ball is located in the second passage for preventing inflation fluid from flowing out of the storage chamber of the container through the second passage of the plug member.

SUMMARY OF THE INVENTION

The present invention relates to an inflator comprising structure defining a chamber. First and second passages extend through the structure to the chamber. A burst disk closes the first passage. The inflator also comprises a fill valve assembly having a valve housing and a valve member. The valve housing is received in the second passage and defines a fill passage. A fluid is stored under pressure in the chamber. An igniter is actuatable for opening the burst disk for enabling fluid to flow out of the chamber through the first passage. The valve member enables flow of the fluid through the fill passage of the valve housing into the chamber and prevents flow out of the chamber through the fill passage.

According to another aspect, the present invention relates to an inflator comprising structure defining a chamber. First and second passages extend through the structure to the chamber. A fluid is stored under pressure in the chamber. A device closes the first passage and is actuatable for enabling fluid to flow out of the chamber through the first passage. The inflator also comprises a fill valve having a valve housing, a valve member, and a plug member. The valve housing is received in the second passage and defines a fill passage. The valve member enables flow of the fluid through the fill passage of the valve housing into the chamber and prevents flow out of the chamber through the fill passage. The plug member seals the fill passage of the valve housing after the fluid is introduced into the chamber through the fill passage. The plug member is spaced away from the valve member outward of the chamber.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 illustrates a vehicle safety system including an inflator constructed in accordance with the present invention;

FIG. 2 is a cross-section of the inflator of FIG. 1 in a non-actuated condition;

FIG. 5 is a cross-section of the inflator of FIG. 1 in an actuated condition; and FIG. 6 is an enlarged view of a portion of an inflator constructed in accordance with a second embodiment of the present invention.

DETAILED DESCRIPTION OF THE INVENTION

Figure 3:
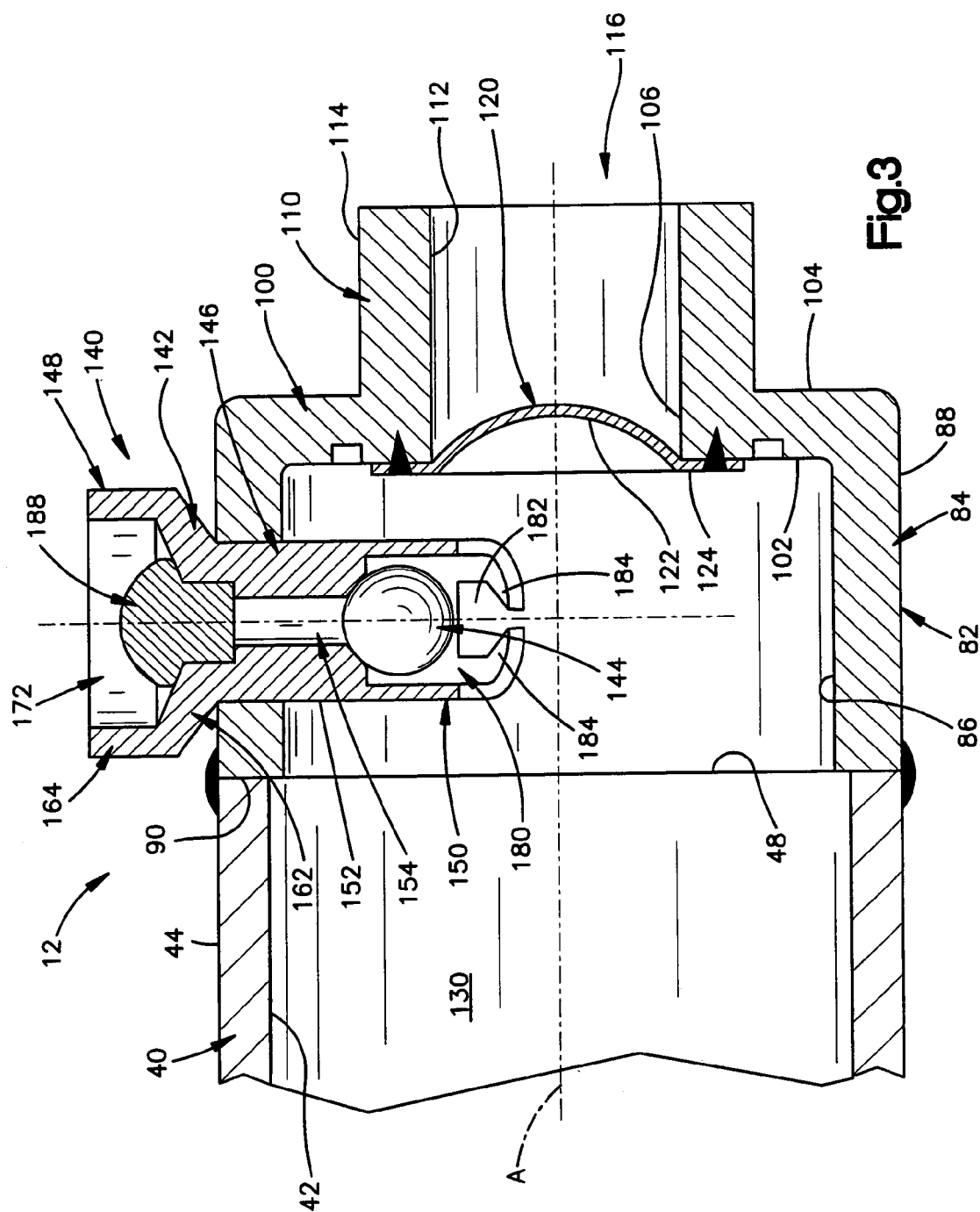
FIG. 3 is an enlarged view of a portion of FIG. 2.

FIG. 1 illustrates a vehicle safety system 10 including the inflator 12 constructed in accordance with the present invention. The inflator 12 of the present invention is for use in inflating an inflatable vehicle occupant protection device of the vehicle safety system 10. The inflatable vehicle occupant protection device of FIG. 1 is an inflatable curtain 14. Alternatively, the inflatable vehicle occupant protection device may include an inflatable air bag, an inflatable seat belt, an inflatable knee bolster, an inflatable headliner, or a knee bolster operated by an inflatable air bag.

The inflatable curtain 14 of FIG. 1 is in a deflated condition and is stored within a housing 16. The inflatable curtain 14, in the deflated condition, and the housing 16 have an elongated configuration and are mounted to a vehicle 18 in a location adjacent both the side structure of the vehicle and a roof 20 of the vehicle. The side structure of the vehicle 18 includes an A-pillar 22, a B-pillar 24, a C-pillar 26, and side windows 28 and 30. FIG. 1 shows four brackets 32 securing the housing 16 and the inflatable curtain 14 to the side structure of the vehicle 18.

In the illustrated embodiment, a fill tube 34 connects the inflator 12 of the present invention to the inflatable curtain 14. The inflator 12 is in fluid communication with the inflatable curtain 14 through the fill tube 34. Upon actuation of the inflator 12, inflation fluid flows through the fill tube 34 and into the inflatable curtain 14. In response to receiving the inflation fluid, the inflatable curtain 14 deploys from the deflated condition to an inflated condition to cover portions of the side structure of the vehicle, such as side windows 28 and 30.

As shown in FIG. 2, the inflator 12 includes a tubular metal body portion 40. The body portion 40 includes cylindrical inner and outer surfaces 42 and 44, respectively. The inner and outer surfaces 42 and 44 are centered on a longitudinal axis A. The body portion 40 of the inflator 12 also has opposite first and second open ends 46 and 48, respectively.

An igniter endcap 50 closes the first open end 46 of the body portion 40. The igniter endcap 50 includes an annular, radially extending peripheral portion 52. An outer diameter of the peripheral portion 52 of the igniter endcap 50 is approximately equal to a diameter of the outer surface 44 of the body portion 40. The peripheral portion 52 of the igniter endcap 50 is affixed to the body portion 40 at the first open end 46. The peripheral portion 52 of the igniter endcap 50 may be welded to or crimped to the body portion 40 at the first open end 46. FIG. 2 shows the peripheral portion 52 of the igniter endcap 50 welded to the body portion 40 at the first open end 46.

The igniter endcap 50 also includes an axially protruding central portion 54. The central portion 54 includes first and second annular, axially extending portions 56 and 58, respectively. The first annular, axially extending portion 56 is disposed adjacent to the peripheral portion 52 and has a diameter that is greater than a diameter of the second annular, axially extending portion 58. A tapered portion 60 connects the first and second annular, axially extending portions 56 and 58. A central flange 62 extends radially inwardly from an end of the second annular, axially extending portion 58 opposite the tapered portion 60. A radially inner surface 64 of the central flange 62 defines a passage 66 through the igniter endcap 50.

An igniter 70 is secured to the igniter endcap 50. The igniter 70 includes a portion 72 containing a pyrotechnic material (not shown) and a resistive wire (not shown) for igniting the pyrotechnic material. The igniter 70 also includes leads 74 for connecting the resistive wire of the igniter to electronic circuitry 76 (FIG. 1) of a vehicle safety system 10. The electronic circuitry 76 includes a sensor 78 for sensing a deployment condition for which inflation of the inflatable curtain 14 is desired. When a deployment condition is sensed, the igniter 70 receives an actuation signal through the leads 74. The igniter 70 is responsive to the actuation signal for actuating the inflator 12 to provide inflation fluid to the inflatable curtain 14.

An isolation disk 80 is affixed to the central flange 62 of the igniter endcap 50 on a side opposite to the igniter 70. The isolation disk 80 closes and seals the passage 66 through the igniter endcap 50. Preferably, the isolation disk 80 is welded to the central flange 62 of the igniter endcap 50.

Figure 4:
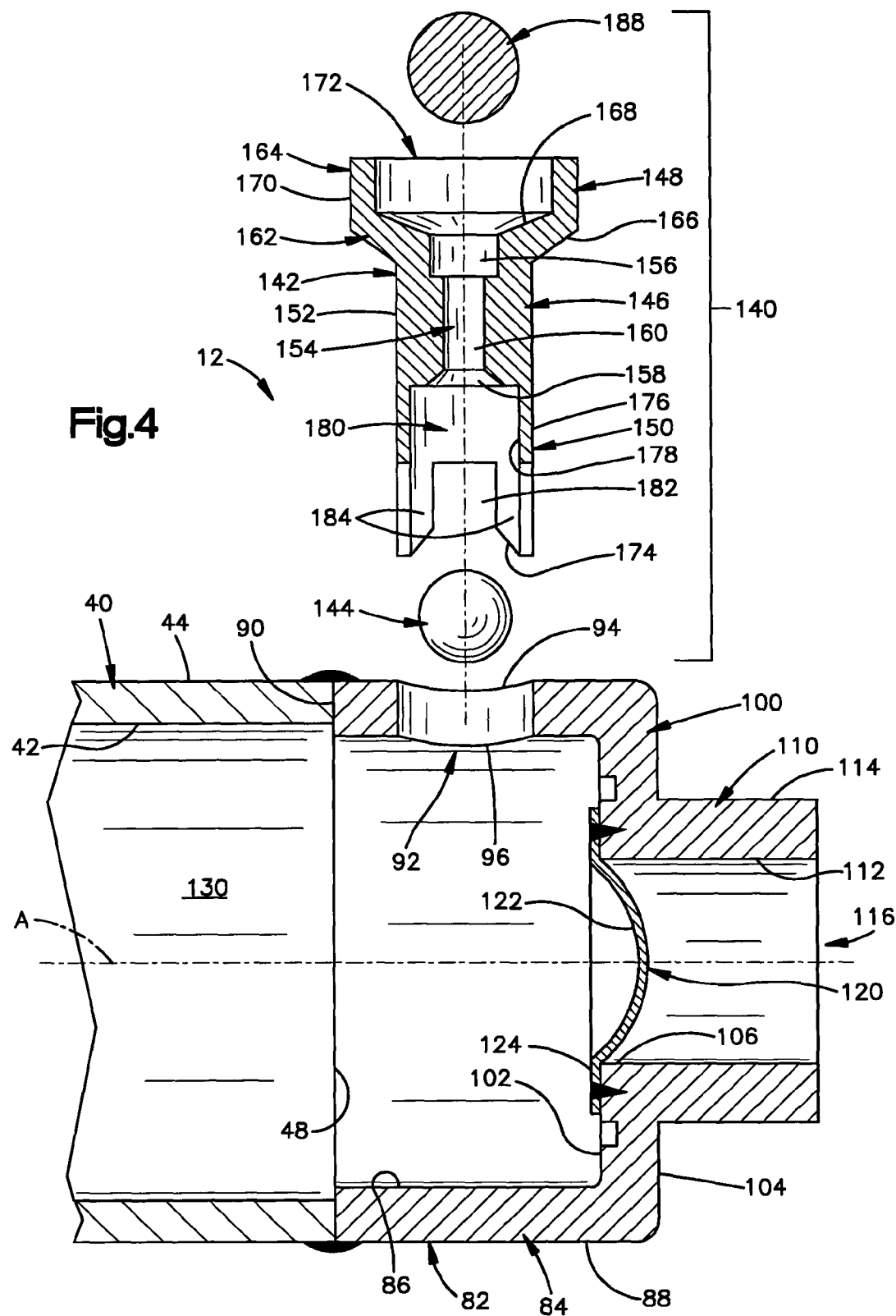
FIG. 4 is a partially exploded view of the portion of the inflator shown in FIG. 3.

The inflator 12 also includes a diffuser endcap 82. The diffuser endcap 82 closes the second open end 48 of the body portion 40 of the inflator 12. The diffuser endcap 82 includes a tubular end portion 84. The tubular end portion 84 includes inner and outer surfaces 86 and 88, respectively. The outer surface 88 of the tubular end portion 84 of the diffuser endcap 82 has a diameter that is equal to the diameter of the outer surface 44 of the body portion 40. An annular end surface 90 of the tubular end portion 84 connects the inner and outer surfaces 86 and 88. A passage 92 (FIG. 4) extends radially through the tubular end portion 84 of the diffuser endcap 82. As shown in FIG. 4, the passage 92 defines an opening 94 on the outer surface 88 of the diffuser endcap 82 and an opening 96 on the inner surface 86 of the diffuser endcap.

An annular wall portion 100 of the diffuser endcap 82 extends radially inwardly from the tubular end portion 84 at an end of the tubular end portion opposite end surface 90. The annular wall portion 100 includes inner and outer surfaces 102 and 104, respectively, and terminates at a cylindrical end surface 106. The inner surface 102 of the annular wall portion 100 joins with and extends perpendicular to the inner surface 86 of the tubular end portion 84 of the diffuser endcap 82. The outer surface 104 of the annular wall portion 100 joins with and extends perpendicular to the outer surface 88 of the tubular end portion 84 of the diffuser endcap 82.

A tubular discharge portion 110 of the diffuser endcap 82 extends axially away from the annular wall portion 100. The tubular discharge portion 110 includes cylindrical inner and outer surfaces 112 and 114, respectively. The inner surface 112 of the tubular discharge portion 110 extends axially from the cylindrical end surface 106 of the annular wall portion 100. The outer surface 114 of the tubular discharge portion 110 joins with and extends perpendicular to the outer surface 104 of the annular wall portion 100. The inner surface 112 of the tubular discharge portion 110 and the cylindrical end surface 106 of the annular wall portion 100 collectively define a passage 116 through which inflation fluid flows. Inflation fluid flows axially, i.e., in a direction that is parallel to the longitudinal axis A of the body portion 40 of the inflator 12, from the tubular discharge portion 110 of the diffuser endcap 82 of FIGS. 2–4.

A metal burst disk 120 closes the passage 116 of the diffuser endcap 82. The burst disk 120 has a domed central portion 122 and a radially outwardly extending flange portion 124 that is affixed to the inner surface 102 of the annular wall portion 100 of the diffuser endcap 82. Preferably, the burst disk 120 is welded to the annular wall portion 100. When the flange portion 124 of the burst disk 120 is affixed to the inner surface 102 of the annular wall portion 100, the domed central portion 122 of the burst disk 120 is located in the passage 116. The burst disk 120 is designed to rupture when subjected to a predetermined differential pressure. In a preferred embodiment, the burst disk 120 is designed to rupture when exposed to a differential pressure of approximately 12,000 pounds per square inch (psi). When the burst disk 120 ruptures, an outlet opening 126 (FIG. 5) is formed in the burst disk 120.

The body portion 40, the igniter endcap 50, and the diffuser endcap 82 collectively define a chamber 130. The chamber 130 extends axially along the longitudinal axis A between the igniter endcap 50 and the diffuser endcap 82. The inner surface 42 of the body portion 40 and the inner surface 86 of the tubular end portion 84 of the diffuser endcap 82 define a radial outer boundary of the chamber 130.

The inflator 12 also includes a fill valve assembly 140 through which the chamber 130 is filled. Details of the fill valve assembly 140 are described with reference to FIGS. 3 and 4. The fill valve assembly 140 includes a valve housing 142 and a valve member 144. The valve housing 142 has a main body portion 146, an outer portion 148, and an inner portion 150. The main body portion 146 of the valve housing 142 is located between the outer and inner portions 148 and 150. The main body portion 146 of the valve housing 142 includes a cylindrical outer surface 152. A fill passage 154 extends through the main body portion 146. As shown in FIG. 4, the fill passage 154 includes a large diameter portion 156, a tapered portion 158, and a smaller diameter portion 160. The large diameter portion 156 of the fill passage 154 is located nearest the outer portion 148 of the valve housing 142. The tapered portion 158 of the fill passage 154 is located nearest the inner portion 150 of the valve housing 142. The smaller diameter portion 160 is located between the large diameter portion 156 and the tapered portion 158 of the fill passage 154.

The outer portion 148 of the valve housing 142 is the widest part of the valve housing. The outer portion 148 includes a tapered shoulder portion 162 and a tubular outer portion 164. The tapered shoulder portion 162 extends radially outwardly of the main body portion 146 of the valve housing 142 as it extends axially away from the main body portion. The tapered shoulder portion 162 includes outer and inner surfaces 166 and 168 (FIG. 4), respectively. The outer surface 166 joins with the cylindrical outer surface 152 of the main body portion 146. The inner surface 168 of the tapered shoulder portion 162 leads to the large diameter portion 156 of the fill passage 154. The tubular outer portion 164 extends axially away from the tapered shoulder portion 162 in a direction opposite to the main body portion 146. The tubular outer portion 164 includes an outer surface 170 (FIG. 4) having a diameter approximately twice the diameter of the cylindrical outer surface 152 of the main body portion 146. An inner diameter of the tubular outer portion 164 defines a mouth 172 that leads to the fill passage 154 of the valve housing 142.

The inner portion 150 of the valve housing 142 is generally tubular and terminates at an end surface 174 (FIG. 4). The inner portion 150 includes cylindrical outer and inner surfaces 176 and 178 (FIG. 4), respectively. The outer surface 176 of the inner portion 150 of the valve housing 142 is coaxial with and has a diameter that is equal to the cylindrical outer surface 152 of the main body portion 146. The inner surface 178 of the inner portion 150 defines a chamber 180. The inner portion 150 of the valve housing 142 includes four cutouts 182, one of which is shown in full in FIG. 4. The cutouts 182 are located adjacent to the end surface 174 of the inner portion 150. The four cutouts 182 separate four finger portions 184 of the inner portion 150 of the valve housing 142. FIG. 4 shows two of the four finger portions 184.

The valve member 144 of the fill valve assembly 140 is a check ball. The check ball 144 is formed from an elastomer. Preferably, the check ball 144 is made from either VITON elastomer (trademark of E.I. DuPont de Nemours & Co.) or a synthetic rubber made from the polymerization of butadiene and sodium. The check ball 144 is placed in the chamber 180 of the inner portion 150 of the valve housing 142. The four finger portions 184 of the inner portion 150 of the valve housing 142 are bent inwardly toward one another to the positions shown in FIG. 3 so as to form a cage for retaining the check ball 144 in the chamber 180. The cutouts 182 between the finger portions 184 enable fluid flow into and out of the chamber 180.

The fill valve assembly 140 is inserted into the passage 92 in the diffuser endcap 82 until the outer surface 166 of the tapered shoulder portion 162 engages the outer surface 88 of the tubular end portion 84 of the diffuser endcap 82. The valve housing 142 is then affixed to the diffuser endcap 82. Preferably, the tapered shoulder portion 162 of the outer portion 148 of the valve housing 142 is welded to the tubular end portion 84 of the diffuser endcap 82. When affixed to the diffuser endcap 82, the inner portion 150 of the valve housing 142 and the check ball 144 are located in the chamber 130.

A combustible gas mixture 186 (FIG. 2) is stored in the chamber 130. The combustible gas mixture 186 preferably includes an inert gas, hydrogen, and oxygen or an inert gas, hydrogen and air. The inert gas may be argon, nitrogen, or any suitable inert gas. Trace amounts of helium may be added to the combustible gas mixture 186 to aid in leak detection. The combustible gas mixture 186 is stored under pressure in the chamber 130 of the inflator 12. Preferably, the pressure of the stored combustible gas mixture 186 in the chamber 130 of the inflator 12 is 6,000 to 7,000 pounds per square inch (psi).

When the fill valve assembly 140 is oriented as shown in FIG. 3 and there is no difference between the air pressure in the chamber 130 and atmospheric pressure, gravity acts on the check ball 144 and the check ball lies on the bent finger portions 184 of the valve housing 142. To fill the chamber 130 of the inflator 12 with the combustible gas mixture 186, a filling tube (not shown) of a filling device (not shown) is inserted into the mouth 172 of the outer portion 148 of the valve housing 142. The combustible gas mixture 186 flows through the fill passage 154 of the valve housing 142 of the fill valve assembly 140 and into the chamber 180 of the inner portion 150 of the valve housing 142 of the fill valve assembly 140. The combustible gas mixture 186 then flows through the cutouts 182 into the chamber 130 of the inflator 12.

As the pressure of the combustible gas mixture 186 stored in the chamber 130 of the inflator 12 increases, the gas pressure in the chamber 130 tends to force the check ball 144 upwardly, as viewed in FIG. 3, toward the main body portion 146 of the valve housing 142 to close the fill passage 154. The flow of the combustible gas mixture 186 through the fill passage 154 toward the chamber 130 moves the check ball 144 away from the main body portion 146 and enables flow into the chamber 130. When the flow of the combustible gas mixture 186 through the fill passage 154 toward the chamber 130 ceases, the check ball 144 moves upwardly, as viewed in FIG. 3, into the tapered portion 158 of the fill passage 154 and seats against the main body portion 146 of the valve housing 142 to close the fill passage. The check ball 144 forms a seal against the main body portion 146 of the valve housing 142 to prevent the escape of the stored combustible gas mixture 186 from the chamber 130 through the fill passage 154.

When the filling tube (not shown) of the filling device (not shown) is removed from the mouth 172 of the tubular outer portion 164 of the outer portion 148 of the valve housing 142, any of the combustible gas mixture 186 that is present in the fill passage 154 of the valve housing 142 dissipates into the atmosphere. Alternatively, the fill passage 154 may be aspirated to remove any of the combustible gas mixture 186 that is present in the fill passage. A metal seal plug 188 is then secured to the valve housing 142 to close and seal the large diameter portion 156 of the fill passage 154. The metal seal plug 188, prior to being secured to the valve housing 142, is a spherical ball, as shown in FIG. 4. The metal seal plug 188 may have a shape other than spherical.

To secure the metal seal plug 188 to the valve housing 142, the inflator 12 is oriented so that the outer portion 148 of the valve housing 142 is located above the check ball 144, as is shown in FIG. 3. The metal seal plug 188 is placed in the mouth 172 of the outer portion 148 of the valve housing 142 and gravity causes the metal seal plug 188 to rest on the inner surface 168 of the tapered shoulder portion 162 of the outer portion 148. The metal seal plug 188 is then heated until a portion of the metal seal plug melts. Since the inner surface 168 of the tapered shoulder portion 162 leads to the large diameter portion 156 of the fill passage 154, the melted portion of the metal seal plug 188 flows along the inner surface 168 and into the large diameter portion 156 of the fill passage 154. When the heat is removed from the metal seal plug 188, the metal seal plug 188 bonds to the valve housing 142 to close and seal the fill passage 154. A portion of the metal seal plug 188 is located within and closes the large diameter portion 156 of the fill passage 154 and a portion of the metal seal plug is located outside of the fill passage and abuts the inner surface 168.

The fill passage 154 spaces the metal seal plug 188 away from the check ball 144 and thus, away from the combustible gas mixture 186 in the chamber 130. The spacing of the metal seal plug 188 away from the chamber 130 and the seal of the check ball 144 over the fill passage 154 enable the metal seal plug to be safely heated without igniting the combustible gas mixture 186.

When the igniter 70 of the inflator 12 receives the actuation signal from the electronic circuitry 76 of the vehicle safety system 10, the igniter 70 is actuated. Combustion products, including a shock wave, from actuation of the igniter 70 travel through the passage 66 in the igniter endcap 50, rupture the isolation disk 80, and enter the chamber 130. The combustion products heat and ignite the combustible gas mixture 186 that is stored under pressure within the chamber 130. The resulting combustion of the combustible gas mixture 186 produces inflation fluid, which is further heated by the combustion of the combustible gas mixture. The heating and ignition of the combustible gas mixture 186 increases the pressure within the chamber 130. When the predetermined differential pressure across the burst disk 120 is reached, the burst disk 120 is ruptured and the outlet opening 126 is formed through the ruptured burst disk. Inflation fluid passes through the outlet opening 126, through the passage 116 in the diffuser endcap 82, and into the fill tube 34 for inflating the inflatable curtain 14. FIG. 5 illustrates an actuated inflator 12 including an actuated igniter 70, a ruptured isolation disk 80, and a ruptured burst disk 120. The metal seal plug 188 and the check ball 144 of the fill valve assembly 140 prevent inflation fluid from passing through the fill passage 154 of the valve housing 142.

FIG. 6 is an enlarged view of a portion of an inflator 12' constructed in accordance with a second embodiment of the present invention. Structures of FIG. 6 that are the same as or similar to structures of FIG. 3 are numbered using the same reference numbers.

The diffuser endcap 82 illustrated in FIG. 6 provides a radial discharge of inflation fluid from the inflator 12'. A tubular discharge portion 210 of the diffuser endcap 82 extends axially away from an annular wall portion 100 of the diffuser endcap. The tubular discharge portion 210 includes cylindrical inner and outer surfaces 212 and 214, respectively. The inner surface 212 of the tubular discharge portion 210 extends from the cylindrical end surface 106 of the annular wall portion 100. The outer surface 214 of the tubular discharge portion 210 joins with and extends perpendicular to the outer surface 104 of the annular wall portion 100. A radially extending wall 216 closes an end of the tubular discharge portion 210 opposite the annular wall portion 100. The radially extending wall 216 includes inner and outer surfaces 218 and 220, respectively. The inner surface 212 of the tubular discharge portion 210 and the inner surface 218 of the radially extending wall 216 collectively form a discharge chamber 222. Passage 116 leads from the chamber 130 into the discharge chamber 222.

A plurality of flow openings 224 extends radially through the tubular discharge portion 210. FIG. 6 illustrates two flow openings 224. The flow openings 224 provide for radial flow of inflation fluid out of the inflator 12'. The inflator 12' of FIG. 6 operates in substantially the same manner as the inflator 12 of FIG. 3 for providing inflation fluid to an inflatable vehicle occupant protection device. The fill valve assembly 140 of FIG. 6 is identical to the fill valve assembly 140 described above with reference to FIGS. 2–5.

From the above description of the invention, those skilled in the art will perceive improvements, changes and modifications. For example, the passage 92 for receiving the fill valve assembly 140 may be located on the body portion 40 of the inflator 12, 12' or on the annular wall portion 100 of the diffuser endcap 82. Also, the inflator 12 may store a non-combustible gas under pressure. The inflator 12 may be connected to the inflatable vehicle occupant protection system in any manner, which may include eliminating the fill tube 34 of FIG. 1. Such improvements, changes and modifications within the skill of the art are intended to be covered by the appended claims.

The invention claimed is:

1. An inflator comprising:
   a tubular body portion having axially spaced first and second ends, an igniter endcap secured to the first end of the tubular body portion and a diffuser endcap secured to the second end of the tubular body portion, the tubular body portion, the igniter endcap, and the diffuser endcap collectively defining a fluid chamber, first and second passages extending through the diffuser endcap;
   a burst disk closing the first passage in the diffuser endcap;
   a fluid stored under pressure in the fluid chamber;
   an igniter supported by the igniter endcap and spaced axially away from the burst disk, the igniter being actuatable for opening the burst disk for enabling fluid to flow out of the fluid chamber through the first passage,
   a fill valve having a valve housing and a valve member that is movable relative to the valve housing, the valve housing being received in the second passage of the diffuser endcap and defining a fill passage for enabling fluid flow into the fluid chamber, the valve member, when located in a first position relative to the valve housing, enabling the flow of the fluid through the fill passage into the fluid chamber, the valve member, when located in a second position relative to the valve housing, preventing fluid flow out of the fluid chamber through the fill passage,
   the second passage extending radially, through the diffuser endcap, relative to a longitudinal axis of the tubular body portion of the inflator, the valve housing extending through the second passage such that the fill passage extends generally perpendicular relative to an extent of the first passage that extends through the diffuser endcap.

2. The inflator of claim 1 wherein the fluid is a combustible gas mixture that is ignitable for providing inflation fluid, the igniter, upon actuation, igniting the combustible gas mixture.

3. The inflator of claim 1 further including a plug for sealing the fill passage of the valve housing, the plug being spaced away from the valve member in a direction outward of the fluid chamber.

4. The inflator of claim 1 wherein a third passage extends through the igniter endcap, a rupturable isolation disk closing the third passage and preventing flow of the fluid out of the fluid chamber through the third passage, combustion products generated from actuation of the igniter rupturing the isolation disk and entering the fluid chamber through the third passage to heat the fluid in the fluid chamber.

5. The inflator of claim 1 wherein the valve housing defines a valve chamber, a plurality of fingers having inwardly bent end portions defining the valve chamber, the valve member located in the valve chamber and movable toward the inwardly bent end portions of the fingers for enabling the flow of fluid into the fluid chamber of the inflator.

6. An inflator comprising:
   structure defining a fluid chamber, first and second passages extending through the structure to the fluid chamber;

a fluid stored under pressure in the fluid chamber;

a device closing the first passage and being actuatable for enabling fluid to flow out of the fluid chamber through the first passage; and a fill valve having a valve housing, a valve member, and a plug member, the valve housing received in the second passage and defining a fill passage, the valve housing including a plurality of fingers having inwardly bent end portions, the fingers defining a valve chamber in which the valve member is located, the valve member when located in a first position in the valve chamber, adjacent the end portions of the fingers, enabling flow of the fluid through the fill passage of the valve housing into the fluid chamber, the valve member when located in a second position in the valve chamber preventing the flow of fluid out of the fluid chamber through the fill passage, the plug member sealing the fill passage of the valve housing after the fluid is introduced into the fluid chamber through the fill passage, the plug member being spaced away from the valve member outward of the fluid chamber.

7. The inflator of claim 6 wherein a portion of the plug member is located in the fill passage of the valve housing.

8. The inflator of claim 6 wherein the fluid is a combustible gas mixture that is ignitable for providing inflation fluid, the inflator also including an igniter that is actuatable for igniting the combustible gas mixture.

9. The inflator of claim 6 wherein the fluid chamber extends axially along a longitudinal axis, the valve housing extending radially into the structure relative to the longitudinally axis and defining the fill passage as radially extending.

10. The inflator of claim 6 wherein the valve housing of the fill valve includes an outer portion, the outer portion forming the widest part of the valve housing and including a surface that leads to the fill passage, the plug member including a first portion that is located in the fill passage and a second portion that abuts the surface of the outer portion.

11. The inflator of claim 6 wherein the fill passage of the fill valve includes first and second tapered portions, a large diameter portion and a small diameter portion interposed between the first and second tapered portions, the valve member being located in the first tapered portion when in the second position for preventing the flow of fluid out of the fluid chamber through the fill passage, the plug member being located in the second tapered portion and in the large diameter portion of the fill passage when the plug member seals the fill passage.

* * * * *